US007289248B2

(12) United States Patent
Yamazaki

(10) Patent No.: US 7,289,248 B2
(45) Date of Patent: Oct. 30, 2007

(54) IMAGE RECORDING APPARATUS AND IMAGE CORRECTION METHOD

(75) Inventor: Yoshirou Yamazaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/226,405

(22) Filed: Sep. 15, 2005

(65) Prior Publication Data

US 2006/0061616 A1 Mar. 23, 2006

(30) Foreign Application Priority Data

Sep. 17, 2004 (JP) ............................ 2004-271833

(51) Int. Cl.
*G06F 15/00* (2006.01)

(52) U.S. Cl. ........................ 358/19; 358/1.2; 358/3.03; 358/3.04; 358/502; 358/504; 347/15; 347/19; 347/42

(58) Field of Classification Search .................. 400/74
See application file for complete search history.

(56) References Cited

U.S. PATENT DOCUMENTS

| | | | | |
|---|---|---|---|---|
| 6,010,205 | A * | 1/2000 | Billet | 347/40 |
| 6,398,342 | B1 * | 6/2002 | Neese et al. | 347/40 |
| 6,443,556 | B1 * | 9/2002 | Garcia et al. | 347/43 |
| 6,454,392 | B1 * | 9/2002 | Lopez et al. | 347/43 |
| 6,467,867 | B1 * | 10/2002 | Worthington et al. | 347/19 |
| 6,629,746 | B2 | 10/2003 | Waldner et al. | |
| 6,702,426 | B2 * | 3/2004 | Yashima | 347/43 |
| 6,965,452 | B2 * | 11/2005 | Garcia et al. | 358/1.9 |
| 2002/0080375 | A1 | 6/2002 | Waldner et al. | |
| 2003/0085950 | A1 | 5/2003 | Yashima | |
| 2003/0086100 | A1 | 5/2003 | Yashima et al. | |
| 2004/0104951 | A1 * | 6/2004 | Shibata et al. | 347/14 |
| 2004/0252148 | A1 * | 12/2004 | Shibata et al. | 347/14 |
| 2006/0109294 | A1 * | 5/2006 | Garcia-Reyero et al. | 347/15 |
| 2006/0192799 | A1 * | 8/2006 | Vega et al. | 347/9 |
| 2006/0262155 | A1 * | 11/2006 | Kuwahara et al. | 347/19 |

FOREIGN PATENT DOCUMENTS

| | | | |
|---|---|---|---|
| JP | 9-83796 | A | 3/1997 |
| JP | 2002086767 | A | 3/2002 |
| JP | 2002-234216 | A | 8/2002 |
| JP | 2003-136763 | A | 5/2003 |
| JP | 2003-136764 | A | 5/2003 |
| JP | 2004-202795 | A | 7/2004 |
| JP | 2004-271833 | | 9/2004 |

* cited by examiner

*Primary Examiner*—Matthew Luu
*Assistant Examiner*—Justin Seo
(74) *Attorney, Agent, or Firm*—Birch, Stewart, Kolasch & Birch LLP

(57) ABSTRACT

The image recording apparatus comprises: a recording head including recording elements which record an image onto a recording medium; an abnormal recording element specification device which specifies an abnormal recording element from the recording elements of the recording head; a correction dot pattern setting device which sets a correction dot pattern for preventing an image abnormality due to the abnormal recording element; an image processing device which generates dot data by performing quantization processing on image data using the correction dot pattern set by the correction dot pattern setting device; and a drive device which drives the recording elements according to the dot data generated by the image processing device.

14 Claims, 12 Drawing Sheets

IMAGE RECORDING APPARATUS AND IMAGE CORRECTION METHOD

BACKGROUND OF THE INVENTION

1. Field of the Invention

The present invention relates to an image recording apparatus and an image correction method, and more particularly, to image correction technology for preventing faults in an image caused by abnormalities in recording elements.

2. Description of the Related Art

In recent years, inkjet recording apparatuses have come to be used widely as data output apparatuses for outputting images, documents, or the like. The inkjet recording apparatus drives recording elements, such as nozzles provided in a recording head, in accordance with data so as to form data onto a recording medium, such as recording paper, by means of ink ejected from the nozzles.

In the inkjet recording apparatus, a desired image is formed on a recording medium by causing a recording head having a plurality of nozzles and a recording medium to move relatively to each other while causing ink droplets to be ejected from the nozzles.

If an abnormality, such as a fault or decline in performance, occurs in a recording element provided in a recording head, then a dot abnormality occurs. Namely, a dot is omitted or the desired dot is not formed in the position where the dot was originally to have been formed on the recording medium, and therefore, a fault occurs in the recorded image. When performing one-pass recording of recording elements using a full line recording head comprising a row of recording elements of a length corresponding to the entire printable width of the recording medium, image defects (artifacts), such a stripe-shaped omissions or non-uniformities in density, are formed extending in the relative conveyance direction of the recording head and the recording medium, thus leading to a marked decline in image quality.

In order to prevent decline in image quality of this kind, methods have been proposed in which a recording element producing a fault or decline in performance is discovered, and omitted dots are compensated for by using other recording elements, such as recording elements located peripherally to the discovered recording element.

Japanese Patent Application Publication No. 2003-136763 discloses an image correction method for inkjet recording described, in which same-color correction (correction using an adjacent nozzle) and different-color correction (correction using different colored ink in the same position) are combined when providing correction for nozzles suffering an ejection failure. In a range where the correction data does not exceed the maximum recordable value, same-color correction is performed, and in a range where the correction data exceeds the maximum recordable value, different-color correction is performed, in such a manner that image defects occurring due to nozzles in an ejection failure state or nozzles producing defective ejection can be prevented satisfactorily without lowering the recording speed.

Japanese Patent Application Publication No. 2003-136764 discloses an image correction method for an inkjet recording apparatus in which a prescribed pattern is output with the object of determining head shading and ejection failures. This prescribed pattern is read in, and correction data is created after performing a visability characteristics computation (or an averaging process within a range of 50 to 300 μm) with respect to the read pattern image, in such a manner that image deterioration caused by nozzles of the recording head producing ejection failures is prevented.

Japanese Patent Application Publication No. 2002-234216 discloses a method for reduction of artifacts in reproduced images, in which artifacts are reduced during the reproduction of an image having a plurality of image points, by taking account of the reproducibility of pixels, which is dependent on the image reproduction apparatus (pixel position error, pixel density error).

Japanese Patent Application Publication No. 09-083796 discloses an image processing apparatus, in which a periodic variation equal to or lower than a quantization level is applied to a signal corrected for density non-uniformities, in such a manner that noise equal to or lower than the quantization level can be alleviated. The noise intrinsic to error diffusion can also be prevented.

However, when correcting an image by using the recording elements peripheral to an abnormal recording element, there is a risk that artifacts, such as dot omissions or non-uniformities in density, may actually become more conspicuous depending on the image processing method (dot forming method) used.

In the image correction method for inkjet recording described in Japanese Patent Application Publication No. 2003-136763 and the image correction method for an inkjet recording apparatus described in Japanese Patent Application Publication No. 2003-136764, image correction is performed by using nozzles located adjacent to an ejection failure nozzle or nozzles of a head corresponding to another color; however, there is no specific disclosure with regard to the processing performed with respect to an abnormal nozzle in a half-toning process.

Furthermore, in the method for reduction of artifacts in reproduced images described in Japanese Patent Application Publication No. 2002-234216 and the image processing apparatus described in Japanese Patent Application Publication No. 09-083796, there is no disclosure with regard to the image correction technology used when a recording element is not functioning correctly, for instance, when it is suffering an ejection failure.

SUMMARY OF THE INVENTION

The present invention has been contrived in view of the foregoing circumstances, an object thereof being to process an image recording apparatus and an image correction method whereby desirable image recording is achieved by preventing image faults, such as artifacts occurring due to abnormalities in recording elements, in accordance with the image recorded.

In order to attain the aforementioned object, the present invention is directed to an image recording apparatus, comprising: a recording head including recording elements which record an image onto a recording medium; an abnormal recording element specification device which specifies an abnormal recording element from the recording elements of the recording head; a correction dot pattern setting device which sets a correction dot pattern for preventing an image abnormality due to the abnormal recording element; an image processing device which generates dot data by performing quantization processing on image data using the correction dot pattern set by the correction dot pattern setting device; and a drive device which drives the recording elements according to the dot data generated by the image processing device.

When an abnormal recording element is specified from among the recording elements of the recording head, a correction dot pattern is set on the basis of the information relating to the abnormal recording element, and quantization processing is carried out using this correction dot pattern, thereby generating dot data in such a manner that image recording is performed by recording elements other than the abnormal recording element. Consequently, it is possible to obtain a desirable image in which artifacts, such as banding caused by an abnormality in a recording element, are prevented.

The correction dot pattern is a dot pattern which is fixed in order to prevent an artifact, such as banding, and it has a width of at least two pixels. Dots are arranged (in other words, dots are set to an "on" state) at pixel positions adjacent to the pixel positions corresponding to the abnormal recording elements, in such a manner that the artifact is prevented.

Dots are not arranged (in other words, the dots are set to an "off" state) in the portion of the correction dot pattern corresponding to the abnormality recording element. Image correction on the basis of fixed correction dot pattern of this kind is particularly valuable when forming an image having a large recording rate, such as a solid image.

The recording elements may be nozzles (ejection apertures) provided in an inkjet recording apparatus, or they may be light-emitting diodes (LEDs), or the like, provided in an LED electrophotographic printer, or a silver halide photographic printer having an LED exposure head.

An abnormality in a recording element includes modes such as inability to perform recording, abnormality of the dot size, abnormality of the dot recording position, and the like. In the case of an inkjet recording apparatus which uses nozzles that eject ink as the recording elements, an "abnormality in a recording element" includes modes such as inability to perform ejection, abnormality in the ejection droplet size, abnormality in the droplet landing position, and the like.

The recording medium also includes items known as recording media, ejection receiving medium, recording paper, and the like.

Preferably, the image recording apparatus further comprises a correction dot pattern storage device which stores a plurality of correction dot patterns taking as a parameter at least one of input data for a pixel corresponding to the abnormal recording element, a position of the abnormal recording element and a position of the pixel corresponding to the abnormal recording element.

It is possible to provide a number of correction patterns corresponding to the input data of the respective pixels, the properties (locality) intrinsic to the recording elements, and the relative coordinates of the pixels corresponding to the abnormality recording element.

The plurality of correction dot patterns stored in the correction dot pattern storage device may be previously determined and stored, or alternatively, a calculation device for calculating the correction dot patterns may be provided. The correction dot pattern may be determined by this calculation device.

The correction dot pattern storage device may be provided as a dedicated memory (storage medium), or it may be combined with another memory (storage medium), such as a ROM or RAM provided in the image processing system.

Preferably, the image recording apparatus further comprises a correction dot pattern selection device which selects a correction dot pattern from the plurality of correction dot patterns stored in the correction dot pattern storage device, in accordance with at least one of the input data for the pixel corresponding to the abnormal recording element, the position of the abnormal recording element and the position of the pixel corresponding to the abnormal recording element.

Since the correction dot pattern can be selected in accordance with the abnormality recording element, it is possible to use the correction dot pattern selectively, depending on at least one of input data for the pixels corresponding to the abnormal recording element, the position of the abnormal recording element, and the positions of the pixels corresponding to the abnormal recording element. Therefore, even more desirable image correction can be achieved.

Preferably, the image recording apparatus further comprises a correction control pattern setting device which sets a correction control pattern for specifying a region where quantization processing is to be performed using the correction dot pattern.

It is possible to increase the effect of reducing image abnormalities by using the fixed correction dot pattern to perform quantization processing for the pixels corresponding to the abnormal recording element and the pixels peripheral to the pixels corresponding to the abnormal recording element. On the other hand, it is possible to make the boundary between the region where the correction dot pattern is used and the region where it is not used less conspicuous, by reducing the ratio of the contribution of the correction dot pattern, in the pixels which are more distant from the abnormal recording element.

Preferably, the image recording apparatus further comprises a correction control pattern storage device which stores a plurality of correction control patterns, taking as a parameter a position of a pixel corresponding to the abnormal recording element.

It is more preferable that the correction control pattern storage device is combined with the memory (storage medium) used for the correction dot pattern storage device described above.

Preferably, the image recording apparatus further comprises a correction control pattern selection device which selects a correction control pattern from the plurality of correction control patterns stored in the correction control pattern storage device in accordance with the position of the pixel corresponding to the abnormal recording element.

It is more preferable that the correction control pattern is selected in combination with the size, and the like, of the correction dot pattern described above.

Preferably, the image processing device carries out quantization processing for maintaining an average value of the input data in a region where the correction dot pattern is not applied.

Since the contribution of the abnormal recording element is low in regions other than the region where an image was originally to have been formed by the abnormal recording element, it is possible to use another quantization process.

Quantization processing which maintains the average value of the input data may include quantization processing such as average preservation, error diffusion, and the like.

Preferably, the image processing device carries out quantization processing for maintaining an average value of the input data if there is a large difference between the input data for the pixel originally to be recorded by the abnormal recording element and the input data for a pixel peripheral to the pixel originally to be recorded by the abnormal recording element.

If a fixed correction pattern is used at an edge where there is a large difference in the pixel data, then the image abnormality may, conversely, become more conspicuous.

Therefore, quantization processing which maintains the average value of the input data is preferably used in such edge regions.

For example, the recording elements include ejection apertures for ejecting liquid onto the recording medium.

The ejection apertures may also include nozzles provided in a print head of an inkjet recording apparatus.

For example, the recording head includes a full line type recording head having a plurality of recording elements arranged over a length corresponding to an entire recordable width of the recording medium; and the image recording apparatus further comprises: a movement device which moves the recording medium and the recording head relatively to each other, by moving at least one of the recording medium and the recording head; and a movement control device which controls the movement device in such a manner that single-pass recording is performed for recording an image onto the recording medium by moving only once the recording medium and the recording head relatively to each other.

A full line ejection head may be formed to a length corresponding to the full width of the recording medium by combining short heads having rows of recording elements which do not reach a length corresponding to the full width of the recording medium, these short heads being joined together in a staggered matrix fashion.

In order to achieve relative movement between the recording medium and the recording head, it is possible to move (convey) the recording medium with respect to a fixed recording head or to move the recording head with respect to a fixed recording medium. Furthermore, it is also possible to move both the recording medium and the recording head.

In order to attain the aforementioned object, the present invention is also directed to an image correction method for an image recording apparatus comprising a recording head having recording elements which record an image onto a recording medium, the method comprising: an abnormal recording element specification step of specifying an abnormal recording element from the recording elements of the recording head; a correction dot pattern setting step of setting a correction dot pattern for preventing an image abnormality due to the abnormal recording element; an image processing step of generating dot data by performing quantization processing on image data using the correction dot pattern set in the correction dot pattern setting step; and a driving step of driving the recording elements according to the dot data generated in the image processing step.

The image recording apparatus may include an inkjet recording apparatus which forms a desired image on a recording medium (ejection receiving medium) by ejecting ink from nozzles (ejection apertures).

According to the present invention, when an abnormality recording element is identified from among the recording elements of a recording head, half-tone processing is carried out on the basis of a fixed correction dot pattern. Furthermore, since the image is divided selectively into a region where half-toning is performed using the correction dot pattern and a region where quantization processing is performed so as to maintain the average value, by using a correction control pattern which controls the region where the correction dot pattern is used and the region where the correction dot pattern is not used it is possible perform a desirable quantization process in accordance with the image to be formed. Hence, the effect of preventing image abnormalities can be enhanced.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Composition of Inkjet Recording Apparatus

Figure 1:
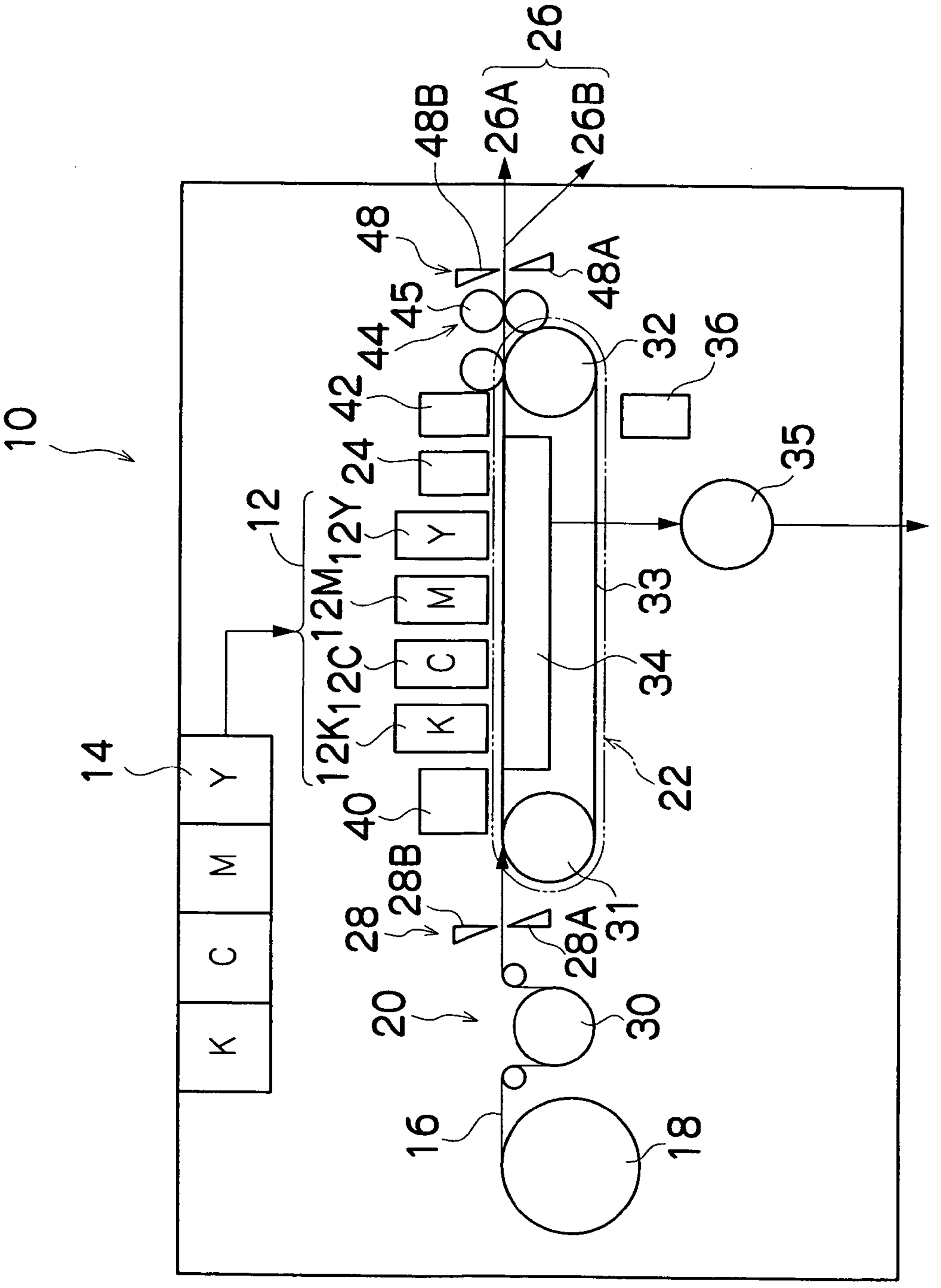
FIG. 1 is a basic schematic drawing of an inkjet recording apparatus according to an embodiment of the present invention.

FIG. 1 is a diagram of the general composition of an inkjet recording apparatus including a print head (recording head) according to an embodiment of the present invention. As shown in FIG. 1, the inkjet recording apparatus 10 comprises: a printing unit 12 having a plurality of inkjet heads 12K, 12C, 12M and 12Y provided for ink colors of black (K), cyan (C), magenta (M) and yellow (Y), respectively; an ink storing and loading unit 14 for storing inks of K, C, M and Y to be supplied to the print heads 12K, 12C, 12M and 12Y; a paper supply unit 18 for supplying recording paper 16; a decurling unit 20 removing curl in the recording paper 16; a suction belt conveyance unit 22 disposed facing the nozzle face (ink-droplet ejection face) of the print unit 12, for conveying the recording paper 16 while keeping the recording paper 16 flat; a print determination unit 24 for reading the printed result produced by the printing unit 12; and a paper output unit 26 for outputting image-printed recording paper (printed matter) to the exterior.

In FIG. 1, a magazine for rolled paper (continuous paper) is shown as an example of the paper supply unit 18; however, more magazines with paper differences such as paper width and quality may be jointly provided. Moreover, papers may be supplied with cassettes that contain cut papers loaded in layers and that are used jointly or in lieu of the magazine for rolled paper.

In the case of a configuration in which a plurality of types of recording paper can be used, it is preferable that an information recording medium such as a bar code and a wireless tag containing information about the type of paper is attached to the magazine, and by reading the information contained in the information recording medium with a predetermined reading device, the type of recording medium to be used (type of medium) is automatically determined, and ink-droplet ejection is controlled so that the ink-droplets are ejected in an appropriate manner in accordance with the type of medium.

The recording paper 16 delivered from the paper supply unit 18 retains curl due to having been loaded in the magazine. In order to remove the curl, heat is applied to the recording paper 16 in the decurling unit 20 by a heating drum 30 in the direction opposite from the curl direction in the magazine. The heating temperature at this time is preferably controlled so that the recording paper 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, whose length is not less than the width of the conveyor pathway of the recording paper 16, and a round blade 28B, which moves along the stationary blade 28A. The stationary blade 28A is disposed on the reverse side of the printed surface of the recording paper 16, and the round blade 28B is disposed on the printed surface side across the conveyor pathway. When cut papers are used, the cutter 28 is not required.

The decurled and cut recording paper 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. The suction chamber 34 provides suction with a fan 35 to generate a negative pressure, and the recording paper 16 is held on the belt 33 by suction.

The belt 33 is driven in the clockwise direction in FIG. 1 by the motive force of a motor 88 (not shown in FIG. 1, but shown in FIG. 5) being transmitted to at least one of the rollers 31 and 32, which the belt 33 is set around, and the recording paper 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, in which the recording paper 16 is pinched and conveyed with nip rollers, instead of the suction belt conveyance unit 22. However, there might be a problem in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the conveyance pathway formed by the suction belt conveyance unit 22. The heating fan 40 blows heated air onto the recording paper 16 to heat the recording paper 16 immediately before printing so that the ink deposited on the recording paper 16 dries more easily.

Figure 2:
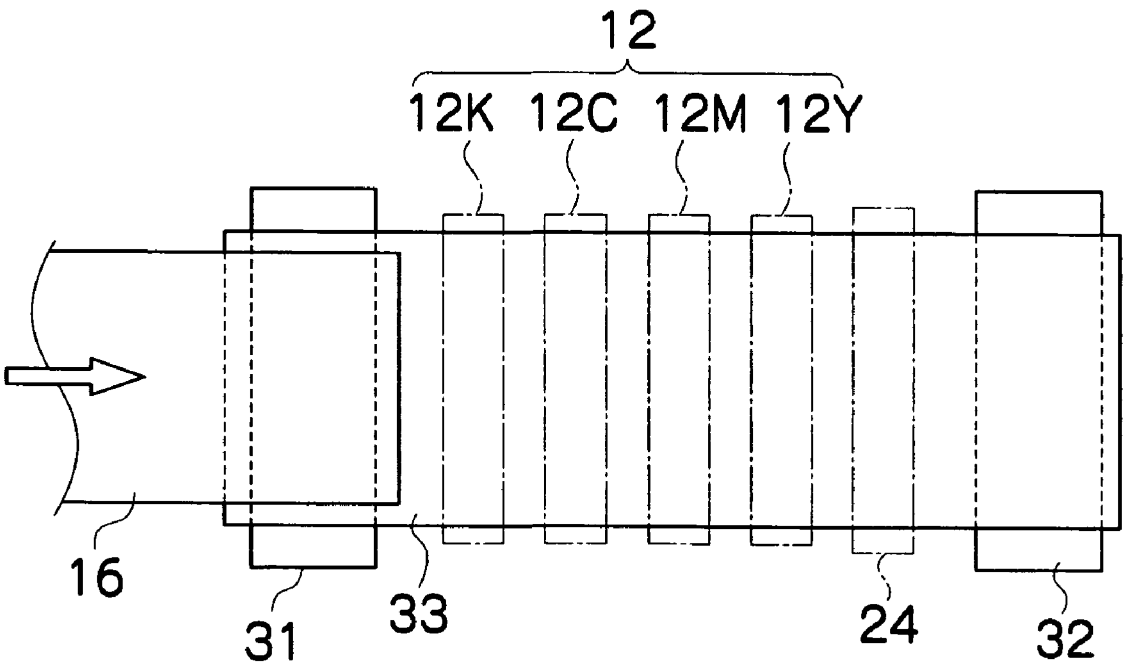
FIG. 2 is a plan view of a principal component around a print unit of the inkjet recording apparatus shown in FIG. 1.

The print unit 12 is a so-called "full line head" in which a line head having a length corresponding to the maximum paper width is arranged in a direction (main scanning direction) that is perpendicular to the conveyance direction of the recording paper (sub-scanning direction) (see FIG. 2). An example of the detailed structure is described below with reference to FIGS. 3A to 3C, and each of the print heads 12K, 12C, 12M, and 12Y is constituted by a line head, in which a plurality of ink ejection ports (nozzles) are arranged along a length that exceeds at least one side of the maximum-size recording paper 16 intended for use in the inkjet recording apparatus 10, as shown in FIG. 2.

The print heads 12K, 12C, 12M, and 12Y are arranged in the order of black (K), cyan (C), magenta (M), and yellow (Y) from the upstream side, following the feed direction of the recording paper 16 (hereinafter, referred to as the sub-scanning direction). A color print can be formed on the recording paper 16 by ejecting the inks from the print heads 12K, 12C, 12M, and 12Y, respectively, onto the recording paper 16 while conveying the recording paper 16.

The print unit 12, in which the full-line heads covering the entire width (the entire width of the printable region) of the paper are thus provided for the respective ink colors, can record an image over the entire surface of the recording paper 16 by performing the action of moving the recording paper 16 and the print unit 12 relatively to each other in the sub-scanning direction just once (in other words, by means of a single sub-scan). Higher-speed printing is thereby made possible and productivity can be improved in comparison with a shuttle type head configuration in which a print head moves reciprocally in the main scanning direction.

Although a configuration with four standard colors, K, M, C and Y, is described in the present embodiment, the combinations of the ink colors and the number of colors are not limited to these, and light and/or dark inks can be added as required. For example, a configuration is possible in which print heads for ejecting light-colored inks such as light cyan and light magenta are added.

As shown in FIG. 1, the ink storing and loading unit 14 has tanks for storing inks of the colors corresponding to the respective print heads 12K, 12C, 12M and 12Y, and each tank is connected to a respective print head 12K, 12C, 12M or 12Y, via a tube channel (not illustrated). The ink storing and loading unit 14 also comprises a warning device (for example, a display device or an alarm sound generator) for warning when the remaining amount of any ink is low, and has a mechanism for preventing loading errors among the colors.

The print determination unit 24 has an image sensor for capturing an image of the ink-droplet deposition result of the printing unit 12, and functions as a device to check for ejection defects such as clogs of the nozzles in the printing unit 12 from the ink-droplet deposition results evaluated through the image sensor.

The print determination unit 24 of the present embodiment is configured with at least a line sensor having rows of photoelectric transducing elements with a width that is greater than the ink-droplet ejection width (image recording width) of the heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

A test pattern printed by the print heads 12K, 12C, 12M, and 12Y of the respective colors is read in by the print determination unit 24, and the ejection performed by each head is determined. The ejection determination includes detection of the ejection, measurement of the dot size, and measurement of the dot formation position. The target image can be used instead of the test pattern.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively. When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders.

Structure of the Head

Next, the structure of a print head will be described. The print heads 12K, 12C, 12M and 12Y provided for the respective ink colors have the same structure, and a reference numeral 50 is hereinafter designated to any of the print heads 12K, 12C, 12M and 12Y.

Figure 3A:
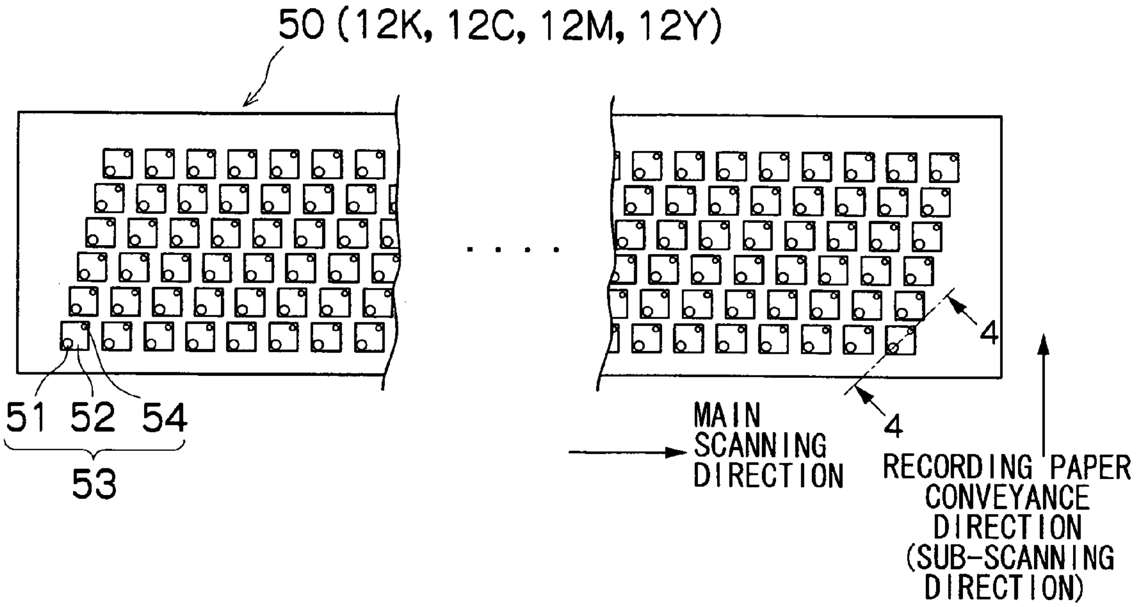
FIGS. 3A to 3C are plan view perspective diagrams showing examples of the composition of a print head.
Figure 3B:
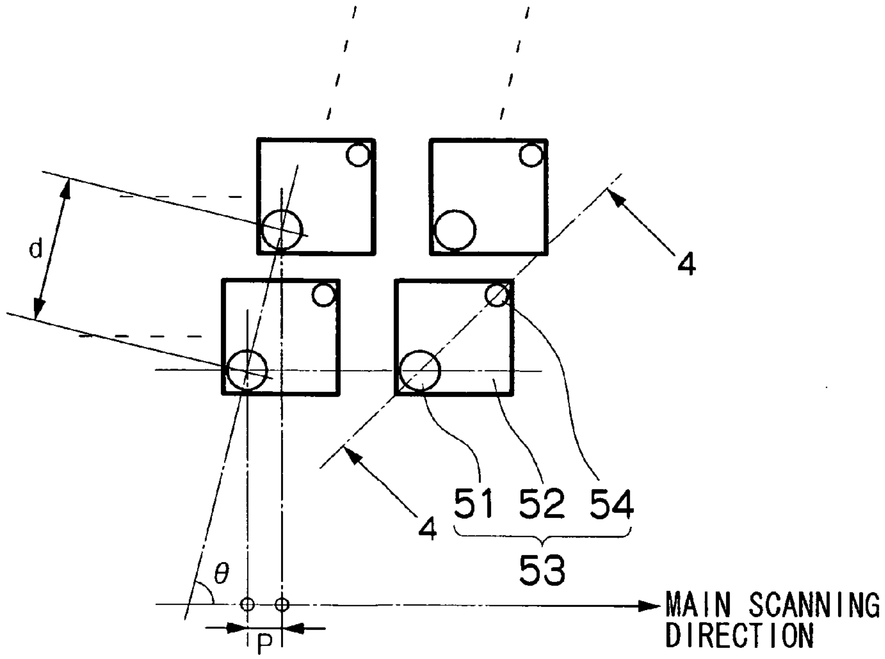

FIG. 3A is a plan view perspective diagram showing an example of the structure of a print head 50, and FIG. 3B is an enlarged diagram of a portion of same. Furthermore, FIG. 3C is a plan view perspective diagram showing a further example of the composition of a print head 50, and FIG. 4 is a cross-sectional diagram showing a three-dimensional composition of an ink chamber unit (being a cross-sectional view along line 4-4 in FIGS. 3A and 3B).

In order to achieve a high density of the dot pitch printed onto the surface of the recording medium, it is necessary to achieve a high density of the nozzle pitch in the print head 50. As shown in FIGS. 3A to 3C, the print head 50 in the present embodiment has a structure in which a plurality of ink chamber units 53 (ejection elements), each comprising nozzles 51 for ejecting ink droplets and pressure chambers 52 corresponding to the nozzles 51, are disposed in the form of a staggered matrix, and the effective nozzle pitch is thereby made small.

More specifically, as shown in FIGS. 3A and 3B, the print head 50 according to the present embodiment is a full-line head having one or more nozzle rows in which a plurality of nozzles 51 for ejecting ink are arranged along a length corresponding to the entire width of the recording medium in a direction substantially perpendicular to the conveyance direction of the recording medium.

Figure 3C:
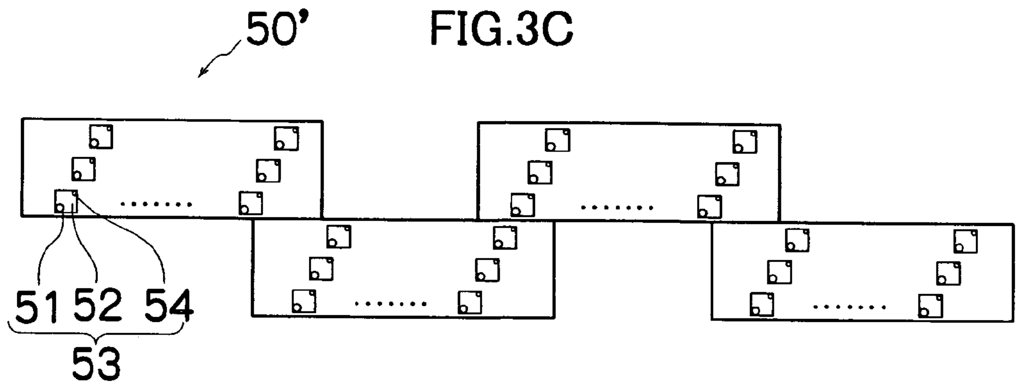
Figure 4:
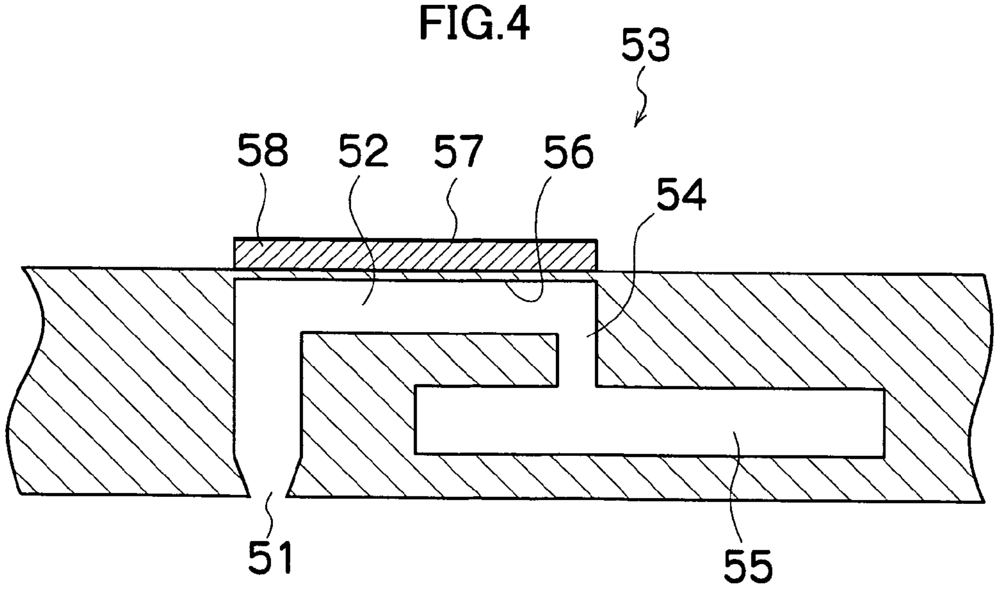
FIG. 4 is a cross-sectional diagram along line 4-4 in FIGS. 3A and 3B.

Moreover, as shown in FIG. 3C, it is also possible to use respective heads 50' of nozzles arranged to a short length in a two-dimensional fashion, and to combine same in a zigzag arrangement, whereby a length corresponding to the full width of the print medium is achieved.

The pressure chamber 52 provided corresponding to each of the nozzles 51 is approximately square-shaped in plan view, and the nozzle 51 and a supply port 54 are provided respectively at either corner on a diagonal of the pressure chamber 52. Each pressure chamber 52 is connected via the supply port 54 to the common flow passage 55.

An actuator 58 provided with an individual electrode 57 is joined to a pressure plate 56 which forms the upper face of the pressure chamber 52, and the actuator 58 is deformed when a drive voltage is supplied to the individual electrode 57, thereby causing ink to be ejected from the nozzle 51. When ink is ejected, new ink is supplied to the pressure chamber 52 from the common flow passage 55, via the supply port 54.

As shown in FIG. 3B, the plurality of ink chamber units 53 having this structure are composed in a lattice arrangement, based on a fixed arrangement pattern having a row direction which coincides with the main scanning direction, and a column direction which, rather than being perpendicular to the main scanning direction, is inclined at a fixed angle of $\theta$ with respect to the main scanning direction. By adopting a structure wherein a plurality of ink chamber units 53 are arranged at a uniform pitch d in a direction having an angle $\theta$ with respect to the main scanning direction, the pitch P of the nozzles when projected to an alignment in the main scanning direction will be $d \times \cos \theta$.

More specifically, the arrangement can be treated equivalently to one wherein the respective nozzles 51 are arranged in a linear fashion at uniform pitch P, in the main scanning direction. By means of this composition, it is possible to achieve a nozzle composition of high density, wherein the nozzle columns projected to an alignment in the main scanning direction reach a total of 2400 per inch (2400 nozzles per inch). Below, in order to facilitate the description, it is supposed that the nozzles 51 are arranged in a linear fashion at a uniform pitch (P), in the longitudinal direction of the head (main scanning direction).

When implementing the present invention, the arrangement of the nozzles is not limited to that of the example illustrated. Moreover, in the present embodiment, a method is employed in which an ink droplet is ejected by means of the deformation of the actuator 58, which is typically a piezoelectric element. However, in implementing the present invention, the method used for ejecting ink is not limited in particular, and instead of a piezo jet method, it is also possible to apply various types of methods, such as a thermal jet method where the ink is heated and bubbles are caused to form therein by means of a heat generating body such as a heater, ink droplets being ejected by means of the pressure of these bubbles.

Description of Control System

Figure 5:
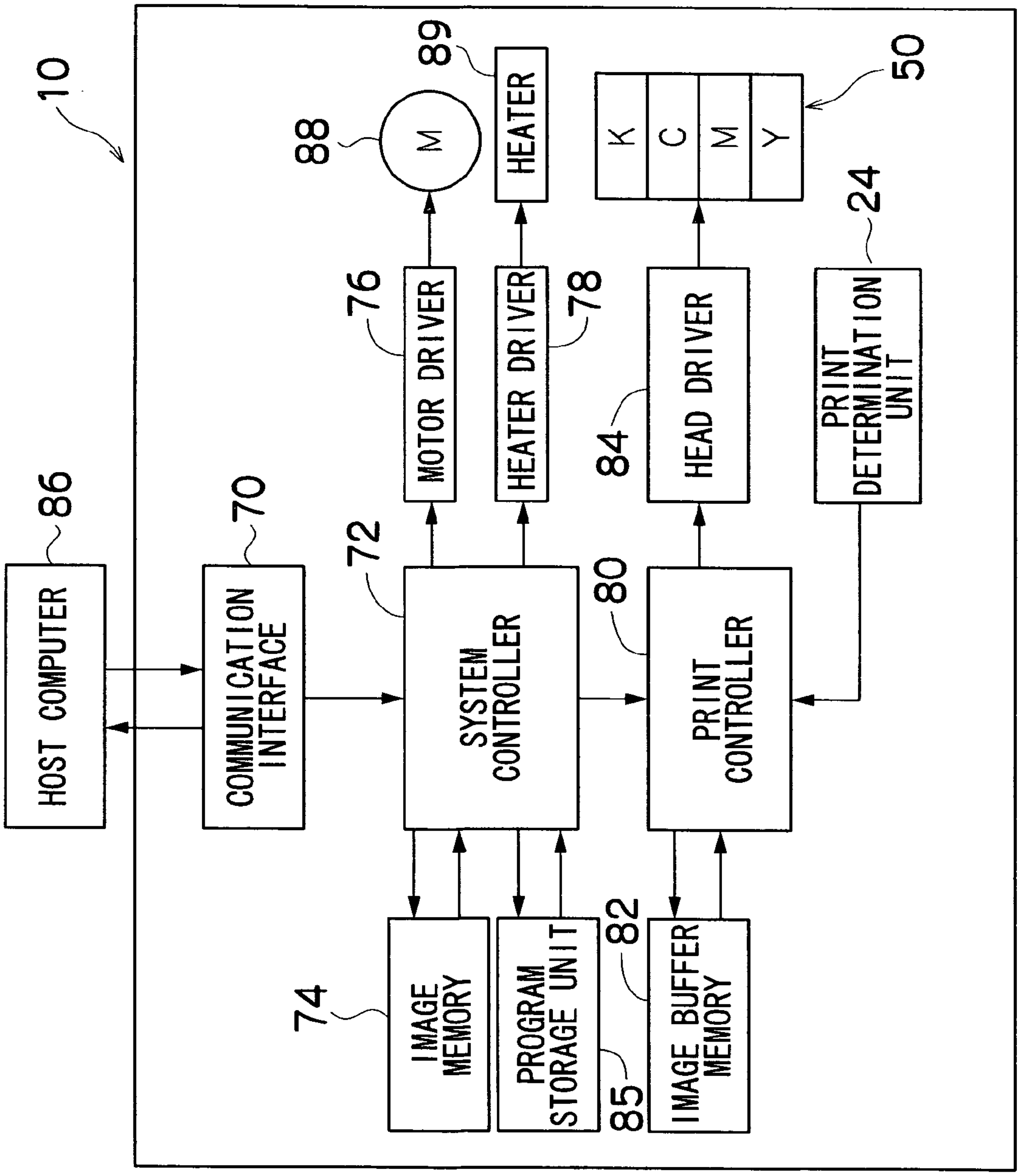
FIG. 5 is a principal block diagram showing the system configuration of the inkjet recording apparatus.

FIG. 5 is a principal block diagram showing the system configuration of the inkjet recording apparatus 10. The inkjet recording apparatus 10 comprises a communication interface 70, a system controller 72, an image memory 74, a motor driver 76, a heater driver 78, a print controller 80, an image buffer memory 82, a head driver 84, a program storage unit 85 and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed. The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communication interface 70, image memory 74, motor driver 76, heater driver 78, and the like, as well as controlling communications with the host computer 86 and writing and reading to and from the image memory 74, and it also generates control signals for controlling the motor 88 and heater 89 of the conveyance system.

The program executed by the CPU of the system controller 72 and the various types of data which are required for control procedures are stored in the image memory 74. The image memory 74 may be a non-writeable storage device, or it may be a rewriteable storage device, such as an EEPROM. The image memory 74 is used as a temporary storage region for the image data, and it is also used as a program development region and a calculation work region for the CPU.

The motor driver 76 drives the motor 88 in accordance with commands from the system controller 72. The heater driver 78 drives the heater 89 of the post-drying unit 42 or the like in accordance with commands from the system controller 72.

The print controller 80 has a signal processing function for performing various tasks, compensations, and other types of processing for generating print control signals from the image data stored in the image memory 74 in accordance with commands from the system controller 72 so as to supply the generated print data (dot data) to the head driver 84. Prescribed signal processing is carried out in the print controller 80, and the ejection amount and the ejection timing of the ink droplets from the respective print heads 50 are controlled via the head driver 84, on the basis of the print data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 5 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the piezoelectric elements 58 of the heads of the respective colors 12K, 12C, 12M and 12Y on the basis of print data supplied by the print controller 80. The head driver 84 can be provided with a feedback control system for maintaining constant drive conditions for the print heads.

The image data to be printed is externally inputted through the communication interface 70, and is stored in the image memory 74. In this stage, the RGB image data is stored in the image memory 74.

The image data stored in the image memory 74 is sent to the print controller 80 through the system controller 72, and is converted to the dot data for each ink color in the print controller 80. In other words, the print controller 80 performs processing for converting the inputted RGB image data into dot data for four colors, K, C, M and Y. The dot data generated by the print controller 80 is stored in the image buffer memory 82.

Various control programs are stored in the program storage unit 85, and the control programs are read and executed in accordance with a command of the system controller 72. For the program storage unit 85, a semiconductor memory such as a ROM or EEPROM may be used, or a magnetic disk may be used. The program storage unit 85 may have an external interface and use a memory card or a PC card. Of course the program storage unit 85 may have a plurality of storage media of these storage media.

The program storage unit 85 may be used along with a storage (memory) device (not shown) for an operation parameter and the like.

The print determination unit 24 is a block that includes the line sensor as described above with reference to FIG. 1, reads the image printed on the recording paper 16, determines the print conditions (presence of the ejection, variation in the dot formation, and the like) by performing desired signal processing, or the like, and provides the determination results of the print conditions to the print controller 80.

According to requirements, the print controller 80 makes various corrections with respect to the head 50 on the basis of information obtained from the print determination unit 24.

These various types of corrections include image correction in which a nozzle producing an ejection failure (or a nozzle producing an ejection abnormality) is identified on the basis of image information obtained from the print determination unit 24, and dot data is generated by correcting the image data in such a manner that dots which were originally to have been formed by the nozzle producing an ejection failure (ejection failure nozzle) are formed instead by using other nozzles which are operating normally. The details of the image correction processing based on ejection failure nozzles are described below.

In the embodiment shown in FIG. 1, the configuration is such that the print determination unit 24 is provided on the print surface side, and the print surface is illuminated by a light source (not shown) such as a cold-cathode tube disposed in the vicinity of the line sensor, and the reflected light is read by means of the line sensor. However, other configurations may be possible for the embodiments of the present invention.

Description of Image Processing

Next, a method for processing an image signal in an inkjet recording apparatus 10 having the composition described above will be explained.

Figure 6:
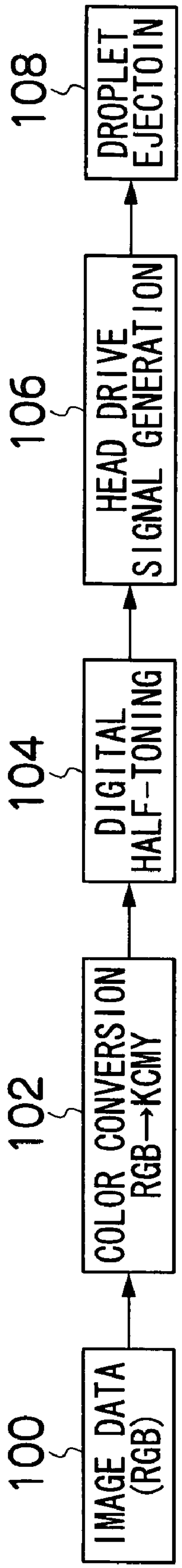
FIG. 6 is a block diagram of an image processing unit in the inkjet recording apparatus.

FIG. 6 is a block diagram of an image processing function in the inkjet recording apparatus 10 according to the present embodiment. As shown in FIG. 6, the inkjet recording apparatus 10 comprises: a color conversion unit 102, which generates KCMY data from input image data (RGB data) 100; a digital half-tone processing unit 104; and a head drive signal generation unit 106, which creates drive signals for the print head 50 according to the dot data obtained by the digital half-toning process, so as to perform droplet ejection 108 in a desired fashion.

As described with reference to FIG. 5, the image data (RGB data) 100 to be printed is inputted to the inkjet recording apparatus 10 via a prescribed image input unit, such as the communication interface 70, and is then supplied to the color conversion unit 102 shown in FIG. 6. The color conversion unit 102 carries out processing for converting the RGB data of each pixel in the image into KCMY data corresponding to the RGB data. The KCMY data generated by the color conversion unit 102 is subjected to tonal graduation correction, and other processing, and is then supplied to the digital half-tone processing unit 104.

The digital half-tone processing unit 104 converts the KCMY image of graduated tones into a halftone image, thus obtaining a dot pattern of a pseudo tone image. The digital half-tone processing unit 104 is described in detail below, and it generates a pseudo tone image by means of an algorithm which combines error diffusion with quantization processing based on threshold values specified by a threshold value matrix, or the like. In the inkjet recording apparatus 10, an image that appears to have a continuous tonal graduation to the human eye is formed by changing the droplet ejection density and the dot size of fine dots created by ink (coloring material), and therefore, it is necessary to convert the input digital image into a dot pattern that reproduces the tonal gradations of the image (namely, the light and shade toning of the image) as faithfully as possible. The digital half-tone processing unit 104 generates a dot pattern (pixel data, dot data) from the input image data, by using the half-toning algorithm described below.

Here, "quantization processing" means processing for determining whether each dot is "on" or "off" (in other words, whether or not to place a dot at a particular pixel position), and image processing that combines the quantization processing with error diffusion processing is referred to as "half-toning". Image processing may also be applied that does not involve diffusion processing for diffusing errors occurring during the quantization process into the unprocessed adjacent pixel positions.

Figure 7:
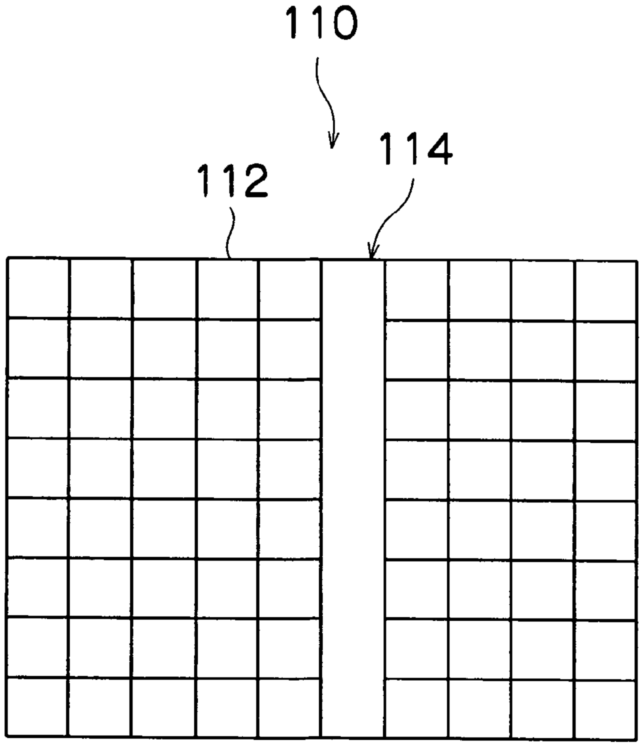
FIG. 7 is a diagram showing an image formed by an image processing method of the related art.

Description of Image Correction Processing Against Occurrence of Ejection Failure Nozzle FIG. 7 shows an image 110 formed (recorded) on a recording medium by an inkjet recording apparatus of the related art. In FIG. 7, the approximately square shapes denoted with the reference numeral 112 represent the pixels that make up the image 110.

When recording an image by means of a full line type printing head such as that shown in FIGS. 2 to 3C, if an ejection failure occurs in a particular nozzle in the print head, then an artifact 114 (banding or missing dots) will arise in the image 110 in the conveyance direction of the recording paper, thus producing a marked decline in image quality.

In the inkjet recording apparatus 10 according to the embodiment of the present invention, an ejection failure nozzle is identified and image correction processing for preventing the artifact such as that denoted with the reference numeral 114 in FIG. 7 is carried out using the nozzles peripheral to the ejection failure nozzle.

Figure 8:
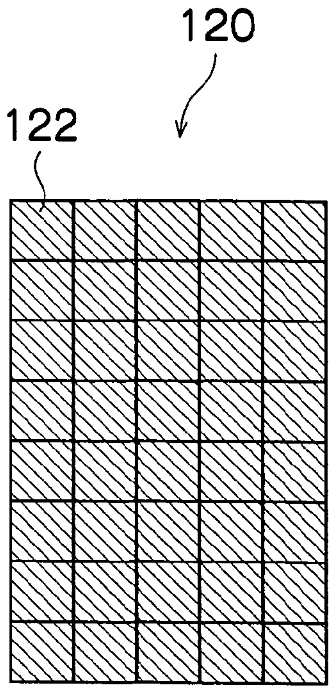
FIG. 8 is a diagram illustrating a dot pattern for compensating for omissions (DCO)

FIG. 8 shows a dot pattern for compensating for omissions (hereafter referred to as a "DCO") 120 used in order to prevent the artifact 114 in the image 110 shown in FIG. 7. The approximate square shapes denoted with the reference numeral 122 inside the DCO 120 correspond to the pixels (pixel positions) 112 in FIG. 7.

The DCO 120 is a fixed pattern (pixel pattern) used for the pixels corresponding to the ejection failure nozzle and the pixels peripheral to the pixels corresponding to the ejection failure nozzle, and the on/off switching of the nozzles peripheral to the ejection failure nozzle is set according to the DCO 120 (in other words, the DCO 120 is constituted by dot "on" information, and quantization processing is carried out according to the DCO 120). A mode is illustrated in the present embodiment in which the quantization process involves binarization processing for setting the on/off status of each dot; however, the quantization processing may also involve ternarization processing, quaternarization processing, or the like.

The DCO contains information for at least the pixels corresponding to the ejection failure nozzle and the pixel adjacent to the pixels corresponding to the ejection failure nozzle (the adjacent pixel in at least one side in the direction substantially perpendicular to the paper conveyance direction).

The DCO 120 can be represented by the function DCO (I, j, x, y) relating to the values I, j and (x, y), where I is the input value of the pixels corresponding to the ejection failure nozzle, j is the nozzle number (ID, nozzle position) of the ejection failure nozzle, and (x, y) is the relative coordinates of the pixels corresponding to the ejection failure nozzle and the pixels peripheral to the pixels corresponding to the ejection failure nozzle. This means that different DCOs can be used, depending on the input value I of the pixel corresponding to the ejection failure nozzle, the nozzle number j of the ejection failure nozzle, and the relative coordinates (x, y) of the pixel originally to have been ejected by the ejection failure nozzle and the pixels peripheral to the pixel originally to have been ejected by the ejection failure nozzle. The plurality of DCOs 120 are specified in advance with respect to these parameters, and the DCOs are stored in (written to) the memory 74 shown in FIG. 5. It is also possible to provide a DCO calculation device in such a manner that DCOs specified by the DCO calculation device can be stored.

In general, the DCO 120 is determined in accordance with a solid image, and differences arise with respect to the image that is actually inputted. In particular, if a DCO 120 is applied directly to a region, such as the edges of the image, where there is change in the input values (namely, the tonal values and the density values for the pixels), then it may result in the artifact 114 actually becoming more conspicuous.

In the present embodiment, use of the DCO 120 shown in FIG. 8 is controlled by means of a control pattern (hereinafter referred to as "CP") shown in FIG. 9. In other words, the CP 130 selectively sets the pixel positions where the DCOs 120 are to be used, in such a manner that the DCOs 120 can be applied partially.

The CP 130 can be expressed as CP (x, y), using the relative coordinates (x, y) of the pixels corresponding to the ejection failure nozzle and the pixels peripheral to the pixels corresponding to the ejection failure nozzle. In other words, similarly to the DCO 120, a plurality of CPs can be calculated in accordance with the relative coordinates (x, y) of the pixels corresponding to the ejection failure nozzles and the pixels peripheral to the pixels corresponding to the ejection failure nozzles, and the plurality of CPs 130 can be stored in the memory 74 shown in FIG. 5.

The approximate square shapes denoted with the reference numeral 132 in the CP 130 correspond to the pixels 112 shown in FIG. 7, and the region enclosed by the thick lines in the CP 130 (namely, one column in the vertical direction having the same x coordinate) denoted with the reference numeral 134 indicates pixels corresponding to the ejection failure nozzle. In this region, since it is not possible to form dots, even if the pixel values are assigned, then all of the pixels are processed as having always the "off" state (in other words, a pixel value of zero).

Figure 9:
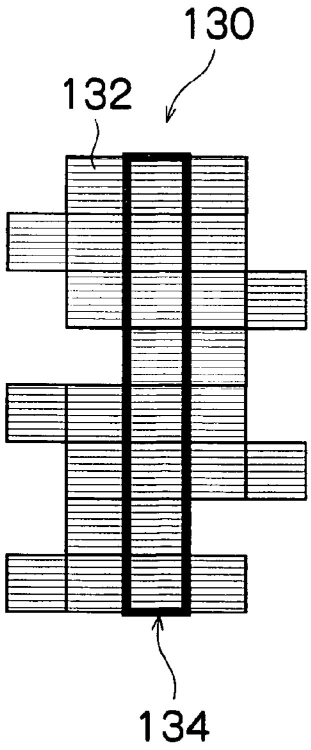
FIG. 9 is a diagram illustrating a control pattern (CP)

The CP 130 shown in FIG. 9 has characteristics whereby it increases the probability of using the DCO 120 in the vicinity of the pixels corresponding to the ejection failure nozzle (in other words, the vicinity of the central region of the CP 130), and it reduces the probability of using the DCO as the position moves toward the periphery of the pixels corresponding to the ejection failure nozzle (in other words, away from the central region of the CP 130).

By adopting a CP 130 in this manner, the probability of the contribution of the DCO 120 is raised, thereby increasing the effect of removing the artifact, in the vicinity of the central region of the CP 130, whereas the probability of the contribution of the DCO 120 is reduced in the peripheral region of the CP 130, thus making it possible to improve the join with the surrounding area of the image.

Next, an image correction process (image correction method) relating to the present embodiment will be described in detail. In this image correction processing, a stripe-shaped artifact is prevented by using a nozzle adjacent to the ejection failure nozzle, and half-toning is performed in such a manner that the average density is maintained, as in an error diffusion method.

Firstly, an ejection failure nozzle is identified on the basis of the image information obtained from the print determination unit 24 shown in FIG. 5. Commonly known technology can be used for identifying the ejection failure nozzle; for example, a recorded image (test pattern) is read in by a reading device, such as a line sensor, and the ejection failure nozzle is identified on the basis of the read results.

When the ejection failure nozzle has been identified, the DCO (I, j, x, y) 120 is specified, as shown in FIG. 8, on the basis of the input value I for the pixels corresponding to the ejection failure nozzle, the nozzle number of the ejection failure nozzle j, and the relative coordinates (x, y) of the pixels corresponding to the ejection failure nozzle and the pixels peripheral to the pixels corresponding to the ejection failure nozzle.

When a DCO 120 is specified in this way, subsequently, a CP (x, y) 130 for controlling the use of the DCO 120 is specified. Using the DCO 120 and the CP 130 thus specified, half-tone processing is carried out progressively on the basis of the input values (image data values) of the respective pixels.

Figure 10:
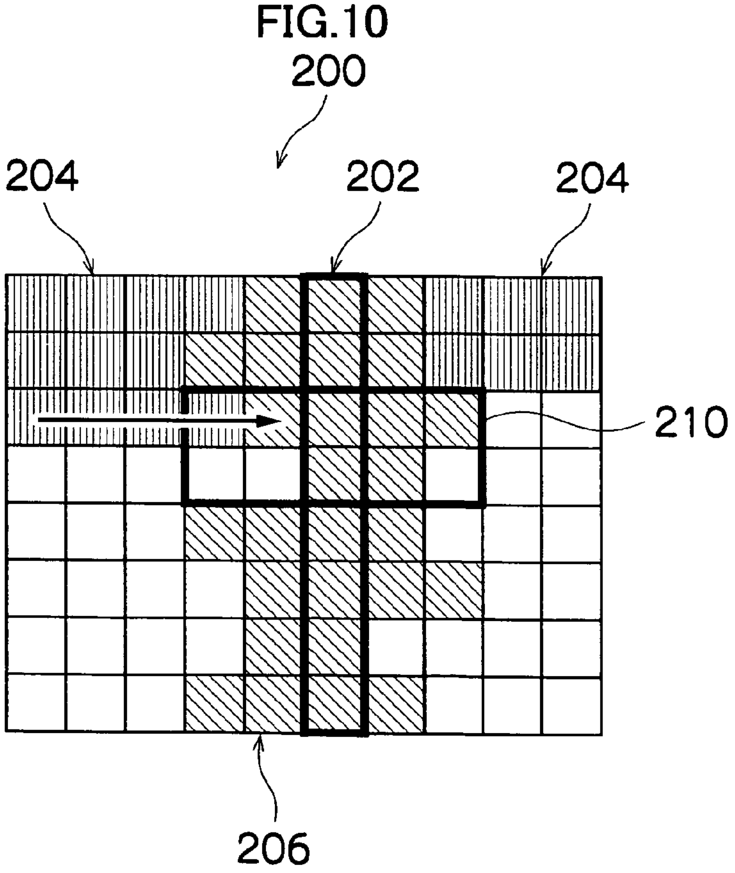
FIG. 10 is a diagram showing an image formed by an image processing method according to an embodiment of the present invention.

FIG. 10 shows an image 200 that has been subjected to half-tone processing by using the image correction processing according to the present embodiment of the invention. In the image 200, the region 202 enclosed by the thick lines represents a region of pixel positions that corresponds to an ejection failure nozzle, the region 204 indicated by the vertical lines represents a region of pixels in which quantization processing is carried out without using the DCO 120, and the region 206 indicated by the diagonal lines represents a region of pixels in which quantization processing is carried out by selecting a use region for the DCO 120 by means of the CP 130. The regions other than these are regions where the pixels are not processed.

The direction indicated by the arrow in image 200 is the direction of processing of the lateral rows. In the half-tone processing of the image 200, firstly, the pixels are processed sequentially in a lateral row, from left to right, starting from the pixel located at the left-hand end of the uppermost row, and when the processing of the uppermost lateral row has been completed, processing of the next row (the row beneath) is performed. In this way, half-tone processing is completed for the whole region of the image 200.

In the region 204, firstly, the pixels to be processed are quantized by using a threshold value matrix. The threshold value matrix specifies threshold values that provide judgment criteria for judging whether or not to place a dot at each respective pixel position (x, y). The pixel values of the pixel positions (x, y) are compared with the threshold values corresponding to those positions, and if the pixel value is greater than the threshold value, then a dot is placed at that position (x, y), whereas if the pixel value is smaller than the threshold value, then no dot is placed at that position. The dots may be handled either way in cases where the pixel value is equal to the threshold value.

Next, the error generated by quantizing the pixel positions processed by the aforementioned procedure is determined. More specifically, the difference between the quantization result and the pixel value is calculated as an error. The errors determined in this fashion are distributed to the adjacent unprocessed pixel positions. The pixel positions to which the error is to be diffused (distributed), and the distribution ratios, are selected appropriately. The pixel values of the unprocessed pixel positions are revised (error-corrected) to the sum of the original value plus the error value distributed from the processed pixel positions, and the unprocessed pixel positions which have been error-corrected in this way are then quantized by means of a threshold value matrix.

On the other hand, in the region 206 of pixels where the DCO 120 is used, the dot arrangement (the on/off status of the dots at the pixel positions) is specified on the basis of the DCO 120 and the CP 130, and hence error calculation is only performed in order to diffuse errors into the adjacent unprocessed pixel positions.

Figure 11:
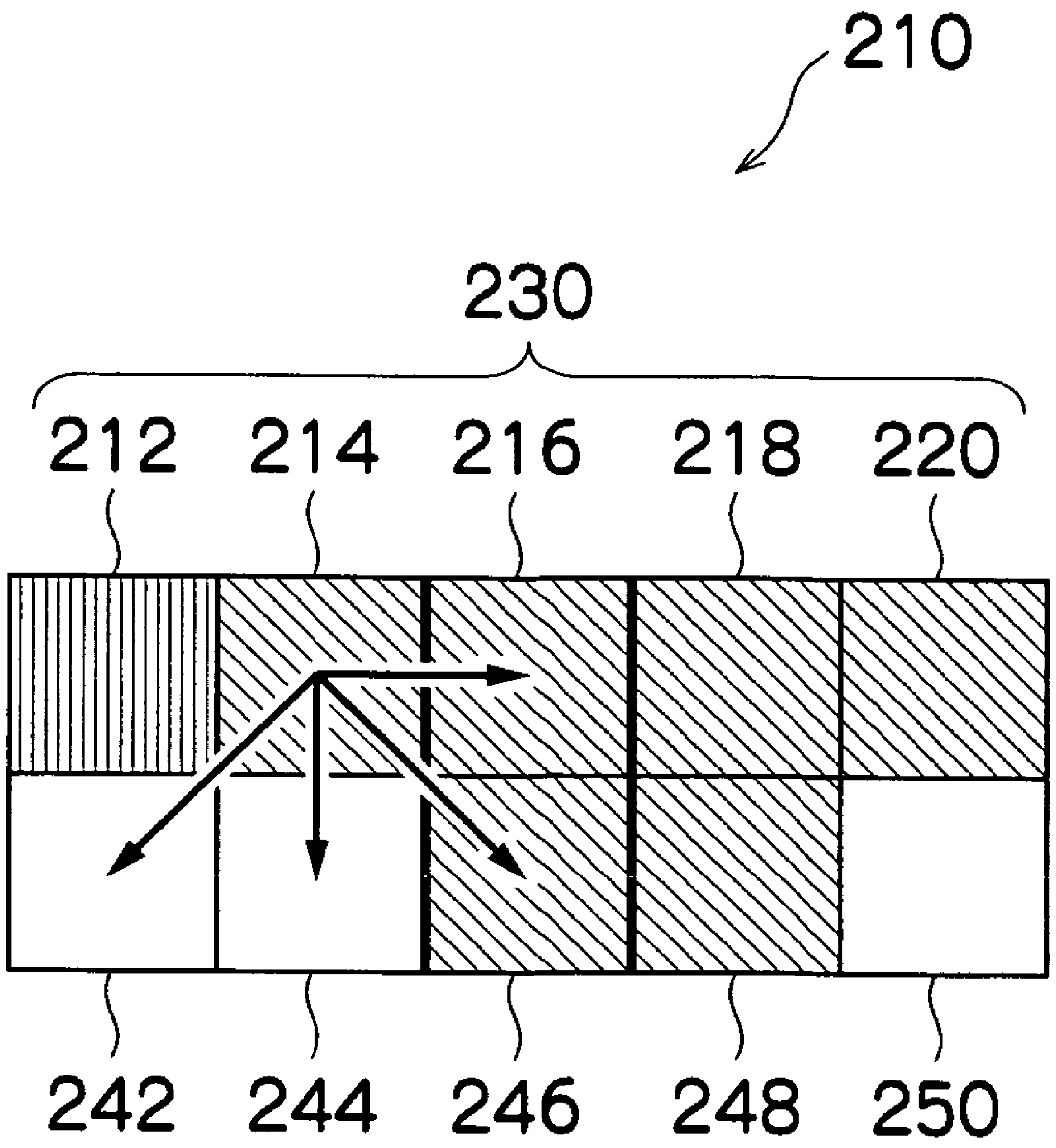
FIG. 11 is a partially enlarged view of the image shown in FIG. 10.

Here, the error diffusion performed in this image correction process will be described. FIG. 11 shows an enlargement of the region 210 in FIG. 10.

The reference numerals 212 to 220 in FIG. 11 indicate a peripheral region 230 containing a pixel 216 corresponding to an ejection failure nozzle. In the present embodiment, the peripheral region 230 comprises five pixels corresponding to the five nozzles in a lateral row (pixels having the same y coordinate) centered on the pixel position corresponding to the ejection failure nozzle. The peripheral region 230 is determined according to the resolution, and at a resolution of 1800 dpi to 2400 dpi, it is desirable that the peripheral region 230 includes five pixels, as shown in FIG. 11.

In the peripheral region 230, a DCO (Ic, jc, x, y) 120 is specified on the basis of the input pixel value Ic of the pixel position 216 corresponding to the ejection failure nozzle, and the number jc of the ejection failure nozzle. The nozzle number jc is required in cases where the correction performed includes the properties (localities) of the nozzles arising from manufacturing variations, such as positional errors in the nozzles, nozzle diameter errors, and the like. If the properties of the nozzles can be disregarded, then a common DCO can be used, and hence the DCO can be specified as DCO (Ic, x, y). If the DCO is specified as DCO (Ic, x, y), then it is possible to save the capacity of the storage medium which stores the DCO (in the present embodiment, the memory 74). Since the ejection failure nozzle is not used, it is not necessary to store the portion of the DCO corresponding to the ejection failure nozzle.

Subsequently, CP (x, y) is set randomly, and the region where DCO (Ic, jc, x, y) is to be used is specified by determining the logical sum (AND) of DCO (Ic, jc, x, y) and CP (x, y).

In the peripheral region 230 shown in FIG. 11, the pixel 212 is a pixel where the DCO 120 is not applied, and after quantization using the threshold value matrix, processing is carried out in order to diffuse the errors into the adjacent unprocessed pixels 214, 242 and 244.

On the other hand, the pixel 214 is a pixel (pixel position) where the DCO 120 is applied, and since the dot position is determined by means of the DCO 120, processing is only performed for diffusing error to the adjacent unprocessed pixels 216, 242, 244 and 246.

In this way, quantization and processing for diffusing the error produced by quantization is carried out progressively for each of the pixels. At pixels 216, 218, 220, 246 and 248, similarly to pixel 214, only error diffusion processing is carried out with respect to the dot arrangement based on the DCO 120, at pixels 242, 244 and 250, similarly to pixel 212, quantization using a threshold value matrix and error diffusion processing is carried out.

It is also possible to adopt a mode which does not depend on the input values I, and which determines threshold values in advance instead of a dot pattern such as DCO (Ic, jc, x, y). In this case, the result of comparing the input pixel value with the previously established threshold value corresponds to the DCO.

If the input value I of the pixel corresponding to the ejection failure nozzle differs greatly from the input value of the pixels in the peripheral region, or if there is a change in the input pixel values, such as a sudden change in density within the peripheral region, due to the pixel corresponding to the ejection failure nozzle forming the edge of the image, or the like, then desirably, quantization is performed using a threshold value matrix (error diffusion method), rather than CP (x, y).

Figure 12:
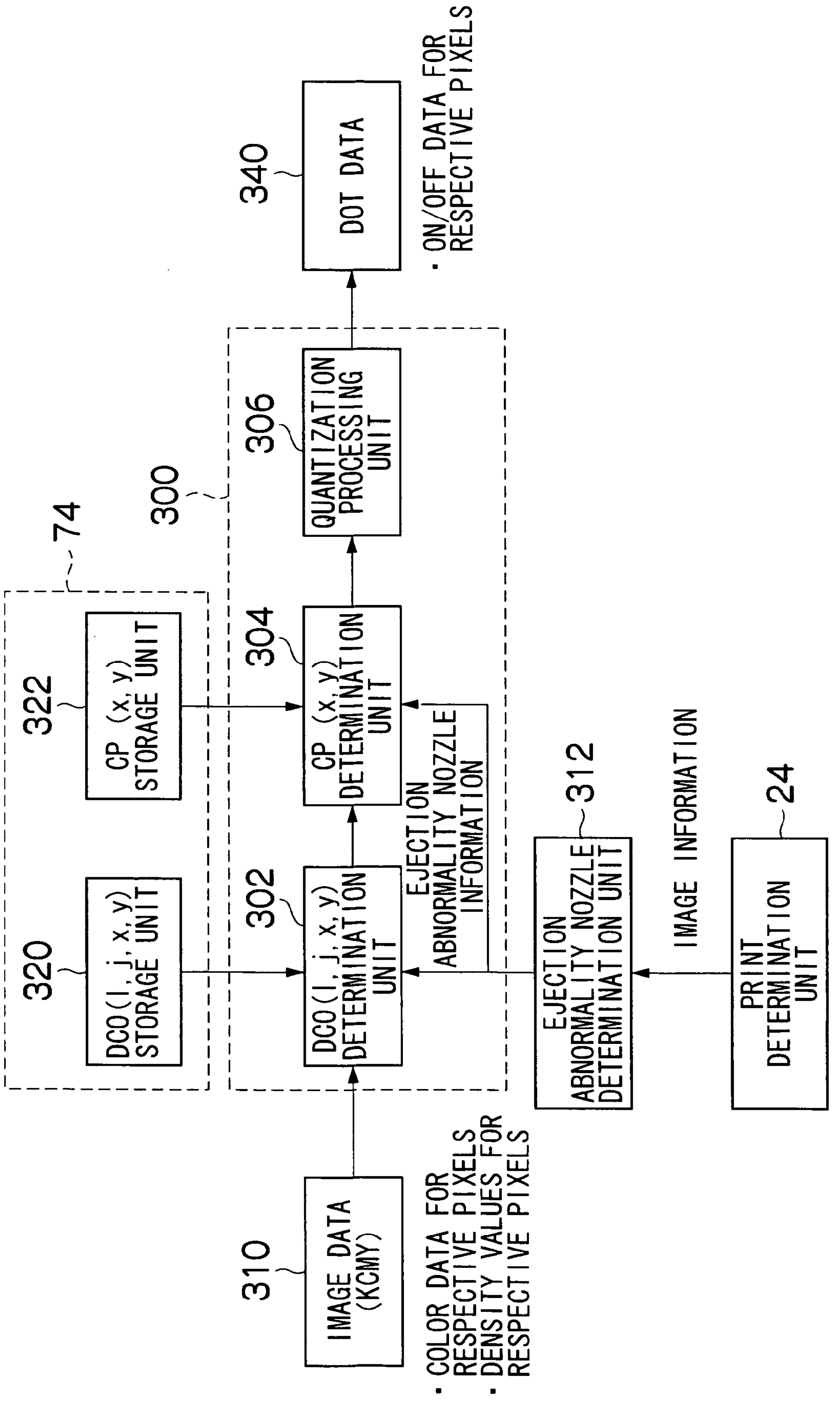
FIG. 12 is a block diagram showing the details of the image processing unit shown in FIG. 6.

FIG. 12 shows an image correction processing unit 300, which performs the aforementioned image correction processing, and the surrounding blocks relating to the image correction processing.

As shown in FIG. 12, the aforementioned image correction processing is carried out principally by the image correction processing unit 300. The image correction processing unit 300 has a DCO specification unit 302, a CP specification unit 304 and a quantization processing unit 306, and is included in the digital half-tone processing unit 104 shown in FIG. 6 and functions as a portion of same.

On the basis of the image information obtained by the print determination unit 24 shown in FIG. 5, the ejection failure nozzle judgment unit 312 judges (determines) an ejection failure nozzle from among the nozzles in the print head 50. The DCO specification unit 302 specifies a DCO (I, j, x, y) corresponding to the ejection failure nozzle, on the basis of the ejection failure nozzle information obtained by the ejection failure nozzle judgment unit 312, and a prescribed DCO is read out from the DCO storage unit 320.

Similarly, the CP specification unit 304 specifies a CP (x, y) for the ejection failure nozzle from the ejection failure nozzle information, and a prescribed CP (x, y) is read out from the CP storage unit 322.

The color conversion unit 102 shown in FIG. 6 converts the RGB data into KCMY data, and in the quantization processing unit 306, the image data 310, for each pixel, including the color data for each pixel and input values, such as density values, is subjected to quantization processing and error diffusion processing using the DCO and the CP specified by the DCO specification unit 302 and the CP specification unit 304, in the peripheral region including the pixel corresponding to the ejection failure nozzle (for example, the peripheral region 230 shown in FIG. 11), and is subjected to quantization processing and error diffusion processing using a threshold value matrix in the other regions, thereby obtaining dot data 340 including on and off information for the respective pixels.

Next, the sequence of control of the aforementioned image correction procedure is described with reference to FIGS. 13 to 15.

Figure 13:
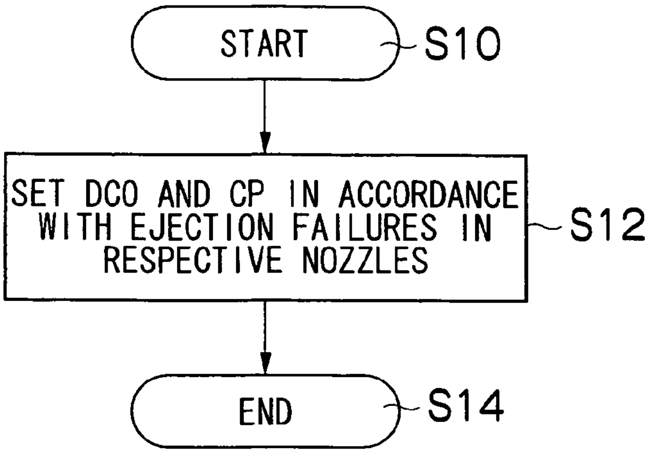
FIG. 13 is a flowchart showing a control sequence for DCO and CP setting procedures.

FIG. 13 is a flowchart showing the sequence of control in a step of specifying DCO (I, j, x, y) and CP (x, y). When the input image data (RGB data) is converted into KCMY data by the color conversion unit 102 shown in FIG. 6, then the image correction processing starts (step S10). A DCO (I, j, x, y) and a CP (x, y) are specified by the DCO specification unit 302 and the CP specification unit 304 shown in FIG. 12, on the basis of the ejection failure nozzle information obtained from the ejection failure nozzle judgment unit 312 shown in FIG. 12 (step S12), whereupon the processing of the present step terminates (step S14).

Figure 14:
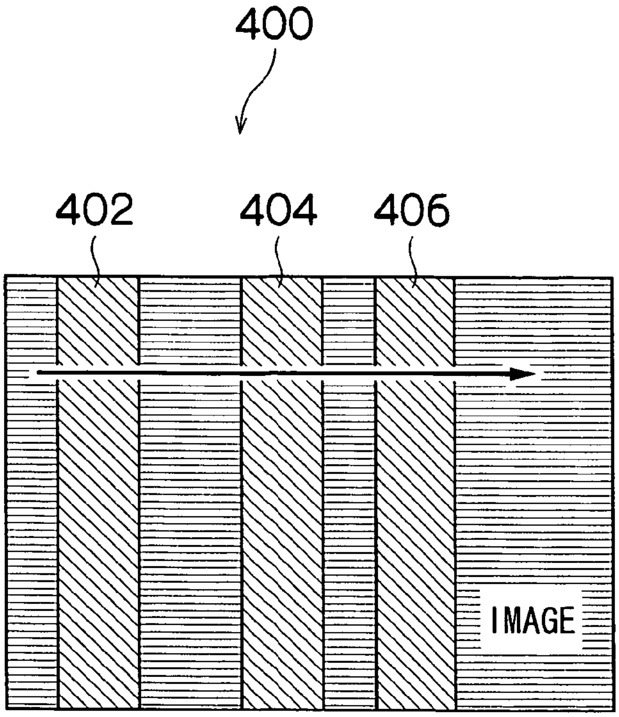
FIG. 14 is a diagram showing an image in which the region where the DCO is to be applied has been set.

In the step of specifying the DCO and the CP, as shown in FIG. 14, the regions 402, 404 and 406 where the DCO 120 is used are specified for each pixel position j corresponding to the ejection failure nozzle.

Figure 15:
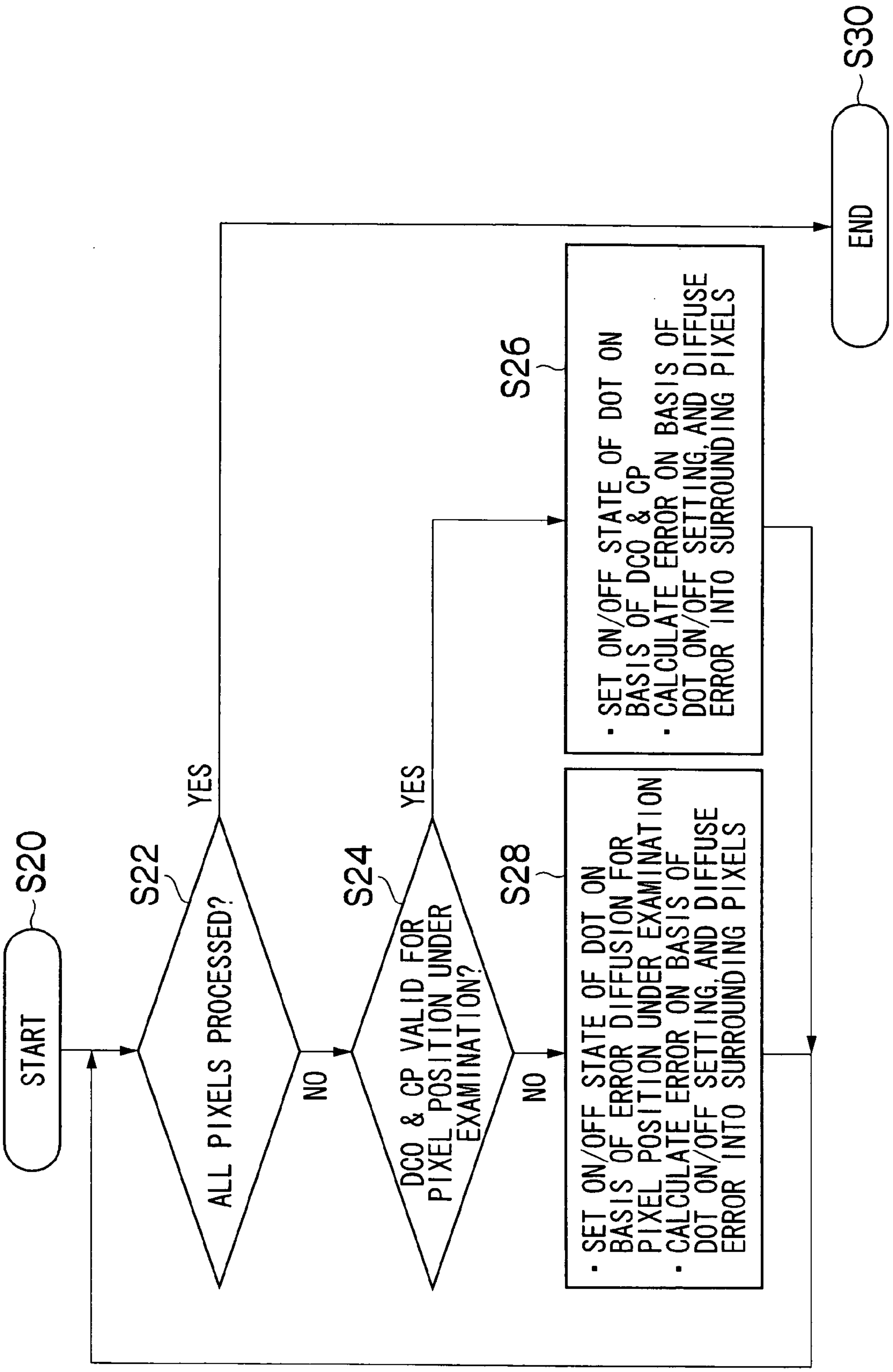
FIG. 15 is a flowchart showing a control sequence for an image correction method according to an embodiment of the present invention.

If the regions where the DCO 120 is to be used are specified in this way, then the half-tone processing step of the image correction processing is carried out in accordance with the flowchart shown in FIG. 15.

When the half-tone processing starts (step S20), it is judged whether or not half-tone processing has been carried out for all of the pixels (step S22). At step S22, if half-toning has been carried out for all of the pixels (YES verdict), then this half-toning process terminates (step S30).

On the other hand, if, at step S22, half-tone processing has not been carried out for all of the pixels (NO verdict), then it is judged whether or not the DCO 120 and the CP 130 are valid for the pixel under consideration (step S24).

At step S24, if it is judged that the DCO 120 and the CP 130 are valid for the pixel under consideration (YES verdict), the procedure advances to step S26, and the on/off state of the dot is specified (namely, quantization processing is implemented) on the basis of the DCO 120 and the CP 130, whereupon the error of the pixel under consideration is calculated on the basis of the on/off state of the dot, this error is diffused into the adjacent unprocessed pixels, and the procedure returns to step S22.

On the other hand, at step S24, if it is judged that the DCO 120 and the CP 130 are not valid for the pixel under consideration (NO verdict), the procedure advances to step S28, and the on/off state of the dot is specified on the basis of a threshold value matrix or error diffusion method, whereupon the error of the pixel under consideration is calculated on the basis of the on/off state of the dot, this error is diffused into the adjacent unprocessed pixels, and the procedure returns to step S22.

In the inkjet recording apparatus 10 having the composition described above, when an ejection failure nozzle is discovered, image correction processing is carried out in such a manner that quantization is performed using the DCO 120 for the pixel corresponding to the ejection failure nozzle and the pixels peripheral to the pixel corresponding to the ejection failure nozzle, in order that the pixels (dots) corresponding to the ejection failure nozzle are compensated for by means of the nozzles peripheral to the ejection failure nozzle. Consequently, it is possible to obtain a desirable image in which a stripe-shaped artifact caused by an ejection failure nozzle is prevented.

Furthermore, by changing the use ratio of the DCO between the pixels corresponding to the ejection failure nozzle and the pixels peripheral to the pixels corresponding to the ejection failure nozzle, by means of a CP 130 which controls the region where the DCO 120 is used, it is possible to make the boundary between the region where the DCO is used and the region where the DCO is not used less conspicuous, and hence more satisfactory correction can be achieved.

Moreover, since half-tone processing is performed on the basis of an average preservation method or error diffusion method in the region where the DCO is not used, then it is possible to achieve desirable half-toning which corresponds to changes in the density of the image in which the average of the pixel values is maintained.

At a pixel position where there is a large difference in density with respect to the pixel position corresponding to the ejection failure nozzle (and in particular, a pixel position having the same y coordinate), the DCO is not used, and consequently, faithful half-toning can be achieved in response to sudden changes in density, and a desirable image can be obtained.

In the present embodiment, a mode has been described in which adjacent nozzles in the same print head as the ejection failure nozzle are used to compensate for pixel position corresponding to an ejection failure nozzle. In an inkjet recording apparatus having a plurality of print heads, it is also possible to use nozzles provided in a different print head to the print head containing the ejection failure nozzle. If using nozzles provided in a different print head, it is possible to perform correction for an ejection failure nozzle by means of one print head, or it is possible to perform correction for an ejection failure nozzle by means of a plurality of print heads.

Furthermore, in the present embodiment, an image correction method relating to nozzles suffering an ejection failure has been described; however, the scope of application of the present invention is not limited to ejection failures, and it may also be applied widely to other ejection abnormalities, such as density abnormalities (ejection volume abnormalities), dot position abnormalities, and the like.

For example, if the ink ejection volume is smaller than the prescribed ejection volume, the dot formed by the ink will be smaller than the prescribed size, and consequently, a variation in the density will be visible. An ejection failure state can be regarded as a state where the ink ejection volume has reduced to a minimum (in other words, an ink ejection volume of zero). Accordingly, it is possible to apply the present image correction method to pixels corresponding to a nozzle producing an ejection volume abnormality, and hence density abnormalities can be prevented.

A density abnormality is determined by obtaining dot size information from the print determination unit 24, expressing the difference between the size of the dot that would have been formed originally and the size of the dot that has actually been formed, in terms of the density, and then judging whether or not there is a density abnormality.

Furthermore, in image correction for an ejection failure nozzle, a dot is not placed at a pixel position corresponding to the ejection failure nozzle, regardless of the DCO 120, but in density correction, the dot on/off status is specified in accordance with the DCO 120.

In other words, when performing density correction by using a DCO, it is desirable that a plurality of DCOs should be prepared in accordance with the corrected density (the difference between the input value and the actual density).

The present image correction method is difficult to apply to nozzles which are in a transient state, and desirably, it is applied to nozzles in a state where any change can be ascertained quantitatively.

The present embodiment has been described with respect to the example of an inkjet recording apparatus, which records images by ejecting ink droplets onto recording paper 16; however, the scope of application of the present invention is not limited to this, and it may also be applied to a broad range of image recording apparatuses (such as LED electrophotographic printers) equipped with recording elements such as LEDs other than nozzles.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image recording apparatus, comprising:

a recording head including recording elements which record an image onto a recording medium;

an abnormal recording element specification device which specifies an abnormal recording element from the recording elements of the recording head;

a correction dot pattern storage device which stores a correction dot pattern that is a fixed pattern representing a dot arrangement for a pixel corresponding to the abnormal recording element and a pixel peripheral to the pixel corresponding to the abnormal recording element;

a correction dot pattern setting device which, in accordance with a position of the abnormal recording element specified by the abnormal recording element specification device, sets the correction dot pattern stored in the correction dot pattern storage device as a set correction dot pattern for a region of the pixel corresponding to the abnormal recording element and the pixel peripheral to the pixel corresponding to the abnormal recording element;

an image processing device which generates dot data by converting input image data representing the image into the dot data by performing quantization processing on the input image data while maintaining an average of input values in the input image data, wherein when the image processing device performs the quantization processing on a prescribed region including the pixel corresponding to the abnormal recording element and the pixel peripheral to the pixel corresponding to the abnormal recording element, the image processing device determines an on/off status of each of dots in the prescribed region by using the set correction dot pattern set by the correction dot pattern setting device; and a drive device which drives the recording elements according to the dot data generated by the image processing device.

2. The image recording apparatus as defined in claim 1, wherein:

the correction dot pattern storage device stores a plurality of pieces of the correction dot pattern corresponding respectively to input values in image data to be inputted for the abnormal recording element;

the image recording apparatus further comprises a correction dot pattern selection device which selects one of the plurality of pieces of the correction dot pattern stored in the correction dot pattern storage device, in accordance with an input value in the input image data for the abnormal recording element; and the correction dot pattern setting device sets the one of the plurality of pieces of the correction dot pattern selected by the correction dot pattern selection device as the set correction dot pattern for the prescribed region including the pixel corresponding to the abnormal recording element and the pixel peripheral to the pixel corresponding to the abnormal recording element.

3. The image recording apparatus as defined in claim 1, wherein:

the correction dot pattern storage device stores a plurality of pieces of the correction dot pattern corresponding respectively to positions of the recording elements;

the image recording apparatus further comprises a correction dot pattern selection device which selects one of the plurality of pieces of the correction dot pattern stored in the correction dot pattern storage device, in accordance with the position of the abnormal recording element; and the correction dot pattern setting device sets the one of the plurality of pieces of the correction dot pattern selected by the correction dot pattern selection device as the set correction dot pattern for the prescribed region including the pixel corresponding to the abnormal recording element and the pixel peripheral to the pixel corresponding to the abnormal recording element.

4. The image recording apparatus as defined in claim 1, further comprising a correction control pattern setting device which sets a correction control pattern for specifying the prescribed region where the quantization processing is to be performed using the set correction dot pattern.

5. The image recording apparatus as defined in claim 4, further comprising a correction control pattern storage device which stores a plurality of pieces of the correction control pattern taking as a parameter a position of the pixel corresponding to the abnormal recording element.

6. The image recording apparatus as defined in claim 5, further comprising a correction control pattern selection device which selects one of the plurality of pieces of the correction control pattern stored in the correction control pattern storage device in accordance with the position of the pixel corresponding to the abnormal recording element.

7. The image recording apparatus as defined in claim 4, wherein when there is a large difference between the input value in the input image data for a pixel originally to be recorded by the abnormal recording element and the input value in the input image data for a pixel peripheral to the pixel originally to be recorded by the abnormal recording element, the image processing device performs the quantization processing on the input image data on the prescribed region including the pixel corresponding to the abnormal recording element and the pixel peripheral to the pixel corresponding to the abnormal recording element for maintaining the average of the input values in the input image data.

8. The image recording apparatus as defined in claim 1, wherein the recording elements include ejection apertures for ejecting liquid onto the recording medium.

9. The image recording apparatus as defined in claim 1, wherein:

the recording head includes a full line type recording head having a plurality of recording elements arranged over a length corresponding to an entire recordable width of the recording medium; and the image recording apparatus further comprises:

a movement device which moves the recording medium and the recording head relatively to each other, by moving at least one of the recording medium and the recording head; and a movement control device which controls the movement device in such a manner that single-pass recording is performed for recording an image onto the recording medium by moving only once the recording medium and the recording head relatively to each other.

10. An image correction method for an image recording apparatus comprising a recording head having recording elements which record an image onto a recording medium, the method comprising:

an abnormal recording element specification step of specifying an abnormal recording element from the recording elements of the recording head;

a correction dot pattern storage step of storing a correction dot pattern that is a fixed pattern representing a dot arrangement for a pixel corresponding to the abnormal recording element and a pixel peripheral to the pixel corresponding to the abnormal recording element;

a correction dot pattern setting step of, in accordance with a position of the abnormal recording element specified in the abnormal recording element specification step, setting the correction dot pattern stored in the correction dot pattern storage step as a set correction dot pattern for a region of the pixel corresponding to the abnormal recording element and the pixel peripheral to the pixel corresponding to the abnormal recording element;

an image processing step of generating dot data by converting input image data representing the image into the dot data by performing quantization processing on the input image data while maintaining an average of input values in the input image data, wherein when the quantization processing is performed on a prescribed region including the pixel corresponding to the abnormal recording element and the pixel peripheral to the pixel corresponding to the abnormal recording element, an on/off status of each of dots in the prescribed region is determined by using the set correction dot pattern set in the correction dot pattern setting step; and a driving step of driving the recording elements according to the dot data generated in the image processing step.

11. The image recording apparatus as defined in claim 1, wherein the correction dot pattern includes a dot pattern in which an on/off status is set for each of dots in relative coordinates of the pixel corresponding to the abnormal recording element and relative coordinates of the pixel peripheral to the pixel corresponding to the abnormal recording element.

12. The image recording apparatus as defined in claim 1, wherein in the correction dot pattern, the dot in the pixel corresponding to the abnormal recording element always has the off status.

13. The image recording apparatus as defined in claim 1, wherein when the image has a resolution of 1800 dpi to 2400 dpi, the correction dot pattern has a width of five pixels in a direction perpendicular to a direction in which the image processing device performs the quantization processing, a center of the width being at the pixel corresponding to the abnormal recording element.

14. The image recording apparatus as defined in claim 1, wherein the correction dot pattern is a fixed pattern representing the dot arrangement determined in accordance with a solid image.

* * * * *